March 22, 1927.
W. B. JASPERT
1,622,116
METHOD FOR MOLDING GEARS
Filed Jan. 30, 1923
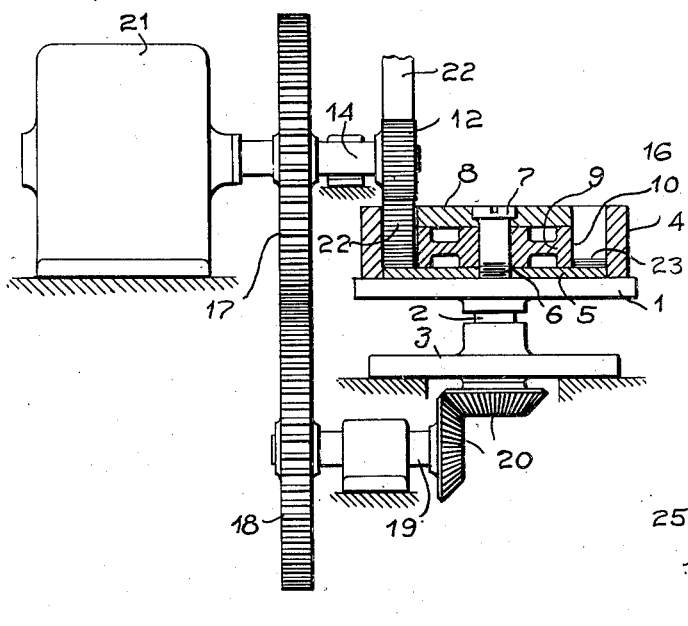
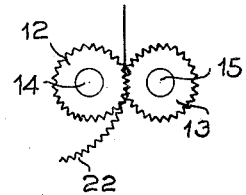
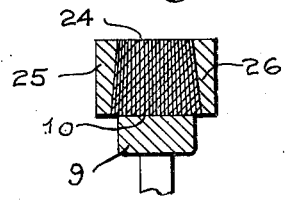
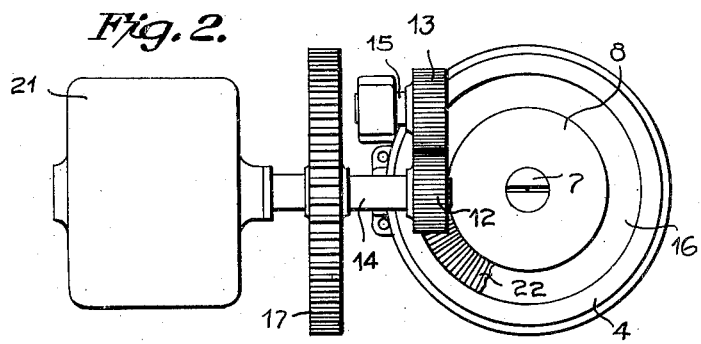
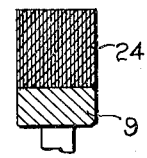
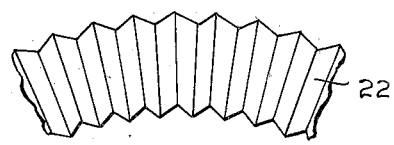
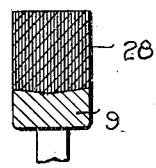
WITNESSES:
R. S. Harrison
J. K. Bierman
INVENTOR
William B. Jaspert.
BY
Wesley G. Carr
ATTORNEY Patented Mar. 22, 1927.

1,622,116

UNITED STATES PATENT OFFICE.

WILLIAM B. JASPERT, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD FOR MOLDING GEARS.

Application filed January 30, 1923. Serial No. 615,913.

My invention relates to composite articles, more especially to such composite gear wheels as embody fibrous material and the well-known phenolic condensation product.

It is among the objects of my invention to provide a method of forming composite gear wheels in which the consolidated ring portion is formed with a minimum amount of waste material and in an efficient and inexpensive manner.

Heretofore, a composite gear wheel, of the type embodying a metallic hub or support, has been formed by punching a plurality of segments or rings from fibrous sheet material, such as duck impregnated with a phenolic condensation product, and assembling such rings or segments about the outer periphery of the knurled surface of a hub or center in the matrix of a suitable mold. The assembled structure was subsequently subjected to heat and pressure to consolidate the built-up layers and form a hardened integral mass united with the metal support.

This process produced an excessive amount of waste material amounting to approximately 35% in the punching of the segments or rings, inasmuch as the remaining material from which they were formed could not be employed for any useful purpose. Another disadvantage is the tedious methods involved in the manufacture, such as assembling the punched material in a dummy matrix and tying the assembled layers with strings to permit handling the material for the purpose of charging the molds, thus involving a large amount of manual labor.

My present invention is directed to a method of forming composite gear wheels which obviates these difficulties in that the material employed is in the form of a continuous strip of fibrous material impregnated with a binding agent, such as the well-known phenolic condensation product, which is fed through a corrugating die direct into the matrix of the mold, forming an endless helix of superposed layers, which are consolidated under heat and pressure in the usual manner. The corrugated strips readily adapt themselves to the annular contour of the mold, in that the material between the successive corrugations spreads at the outer or larger periphery, which constitutes the inside surface of the matrix, and is free to contract at the smaller periphery constituting the outer surface of the matrix hub member contained in the mold.

In the accompanying drawing constituting a part hereof, and in which like reference characters designate like parts;—

Figure 1 is a side elevational view, partially in section, illustrating an apparatus for practicing my process of forming composite gear wheels;

Fig. 2 is a plan view thereof;

Fig. 3 is a side elevational view of a pair of corrugating dies employed for crimping or corrugating the fibrous sheet material;

Fig. 4 is a plan view of a fragmentary portion of a strip after it has passed through the corrugated dies of Fig. 3;

Fig. 5 is a cross-sectional view of a gear wheel molded in accordance with my invention, showing a plurality of pressure rings making contact with the molded portion;

Fig. 6 is a cross-sectional view of a fragmentary portion of a molded gear wheel; and Fig. 7 is a cross-sectional view of a modified hub structure.

Referring to Figs. 1 and 2, my apparatus comprises a table 1, provided with a shaft 2, journaled in a suitable bearing bracket 3. A mold, comprising a matrix 4, a base plate 5, having a threaded opening 6 therein, which is adapted to receive a bolt 7, extending through a clamping plate 8 for securing a metallic hub member 9 thereto, is mounted on the base 1. The hub 9 is provided with a roughened outer periphery 10, having a multiplicity of small recesses formed by knurling.

A corrugating die comprises a pair of fluted co-operating wheels 12 and 13 that are secured to the motor shaft 14 and the stud shaft 15, respectively, in alinement with the opening 16 in the mold. A pair of gear wheels 17 and 18, mounted respectively on the motor shaft 14 and the shaft 19, connect the dies 12 and 13 to the work table 1, through the bevel gears 20. The shaft 14 may be actuated through a belt drive, or a motor 21 may be connected thereto, which actuates the dies and work table simultaneously.

The gearing may be of such proportion and so arranged as to obtain any desired speed of rotation of the table 1 relative to the peripheral speed of the dies 12 and 13, so that the speed of rotation of the mold on the table 1 corresponds to the rate of feeding effected by the dies.

A strip of fibrous material 22, such as fabric, which has been previously impregnated with a binding agent, is fed from a supply roll (not shown) into the dies 12 and 13, which corrugates it in the manner shown in Fig. 4, and feeds it directly into the mold, which rotates, thereby forming a continuous helix of superposed layers 23 (Fig. 1) until a sufficient number of such layers have been built up around the hub member 9. Once the number of layers has been determined, a revolution counter may be connected to the shaft 2 or the corrugating dies to indicate the number of layers deposited in the mold. The strip is cut either above or below the corrugating dies and the mold removed from the work table 1. A pressure ring is inserted on top of the assembled layers, and the mold is then subjected to heat and pressure in a suitable hydraulic press to compact and consolidate the material, forming an integral mass which adheres to the hub member 9 by being forced into the recesses 10 in its outer periphery.

The difference of the outer and inner diameters of the opening 16 in the mold will vary the density of the composite ring member 24 (Fig. 6) unless provision is made to allow for this difference in the molding operation. This can be accomplished by employing a pair of pressure rings 25 having a tapered surface 26 (Fig. 5) to mold the ring 24 in a substantially dove-tail shape, and the tapered surfaces of the finished gear may be machined flush with the face 27 of the hub 9, as shown in Fig. 6. The difference in the amount of the material between the outer and inner peripheries of the ring is approximately 8%, which is wasted in machining, as compared with the 35% waste in the prior punching operations.

The excess material at the outer periphery of the hub 9 may be taken care of by recessing the outer periphery of the hub, as shown in Fig. 7, either in the form of a V groove 28, or a concave radius, the groove corresponding, in volume, to the amount of material displaced when employing the straight pressure rings instead of the tapered ring members 25.

It is evident, from the above description of my invention, that gear wheels manufactured in accordance therewith are inexpensive, economical and adapted to be made by an automatic process in production quantities without sacrificing any of the qualities essential to the finished gear wheel.

Although I have described a specific embodiment of my invention, it will be obvious to those skilled in the art that various modifications may be made in the general design of the apparatus herein illustrated, and the steps of the method disclosed, without departing from the principles herein set forth.

I claim as my invention:—

1. A method of making a composite article which comprises providing an endless strip of fibrous sheet material impregnated with a binder, corrugating the strip and feeding the same in a continuous helix into the matrix of a mold to form a determined number of superposed layers, and consolidating said layers by the application of heat and pressure.

2. A method of making a composite article which comprises providing an endless strip of fibrous sheet material impregnated with a binder, corrugating the strip and feeding the same in a continuous helix into the matrix of a mold to form a determined number of superposed layers about an annular metallic hub member inserted therein, and consolidating said layers and uniting them with said hub by the application of heat and pressure.

3. A method of making a composite article which comprises providing an endless strip of fibrous sheet material impregnated with a binder, corrugating the strip and feeding the same in a continuous helix into the matrix of a mold to form a plurality of superposed layers about the roughened outer periphery of an annular metallic hub member and applying heat and pressure thereto to consolidate said layers to form a ring member integral with said hub.

4. A method of making a composite article which comprises providing an endless strip of fibrous sheet material impregnated with a phenolic condensation product, corrugating the strip and feeding the same in a continuous helix into the matrix of a mold to form a determined number of superposed layers about the roughened outer periphery of an annular metallic hub member, and applying heat and pressure thereto to consolidate said layers to form a ring member with said hub.

5. A method of making a composite article which comprises providing an endless strip of fibrous material impregnated with a binding material, corrugating the strip and feeding the same into a rotating mold to form a plurality of superposed layers, inserting a pressure ring into the charged mold and inserting the same between a pair of heatable platens of a hydraulic press to consolidate the material into a hardened mass.

In testimony whereof, I have hereunto subscribed my name this 15th day of January, 1923.

WILLIAM B. JASPERT.